(12) United States Patent
Kingston (10) Patent No.: US 7,399,252 B2
(45) Date of Patent: Jul. 15, 2008

(54) ARRANGEMENT FOR DRIVING A WHEEL OF A VEHICLE, AND A PLANET CARRIER

(75) Inventor: Tim Kingston, Eskilstuna (SE)

(73) Assignee: Volvo Construction Equipment Holding Sweden A B, Eskilstuna (SE)

( * ) Notice: Subject to any disclaimer, the term of this patent is extended or adjusted under 35 U.S.C. 154(b) by 4 days.

(21) Appl. No.: 11/308,135

(22) Filed: Mar. 8, 2006

(65) Prior Publication Data

US 2006/0183592 A1    Aug. 17, 2006

Related U.S. Application Data

(63) Continuation of application No. PCT/SE2004/001360, filed on Sep. 21, 2004.

(30) Foreign Application Priority Data

Sep. 26, 2003   (SE)   ................................. 0302568-1

(51) Int. Cl.
    *F16H 57/08*   (2006.01)
(52) U.S. Cl. ...................................... 475/331
(58) Field of Classification Search ................. 475/323, 475/331, 348; 180/372; 74/530
    See application file for complete search history.

(56) References Cited

U.S. PATENT DOCUMENTS

| | | | |
|---|---|---|---|
| 1,341,276 A * | 5/1920 | MacDonald | ................. 475/232 |
| 2,998,735 A * | 9/1961 | Elfes | ........................... 475/346 |
| 3,943,787 A | 3/1976 | Hicks | |
| 5,816,971 A * | 10/1998 | Zentmyer et al. | ............. 475/84 |
| 6,090,006 A | 7/2000 | Kingston | |
| 6,540,617 B2 * | 4/2003 | Lindenthal et al. | .......... 464/135 |
| 6,663,531 B2 | 12/2003 | Skrabs | |
| 6,817,963 B1 * | 11/2004 | Solka | ......................... 475/323 |
| 2005/0164823 A1 * | 7/2005 | Huber et al. | ................. 475/331 |

FOREIGN PATENT DOCUMENTS

WO    WO 0309900    5/2003

OTHER PUBLICATIONS

International Search Report from corresponding International Application No. PCT/SE2004/001360.

* cited by examiner

*Primary Examiner*—Roger Pang
(74) *Attorney, Agent, or Firm*—WRB-IP LLP (57) ABSTRACT

The invention relates to an arrangement for driving a wheel of a vehicle comprising a planetary gear set, which in turn comprises a planet carrier. At least one surface of the planet carrier has a toothed structure and extends in such a way that the toothed structure is exposed in the axial direction of the planet carrier. The arrangement comprises a power transmission part and at least one surface of the power transmission part has a toothed structure that corresponds to the toothed structure of the planet carrier surface and an extent that corresponds to the extent of the planet carrier surface. The toothed structures of the planet carrier and the power transmission part intermesh with one another. The invention also relates to the planet carrier per se.

23 Claims, 7 Drawing Sheets

ARRANGEMENT FOR DRIVING A WHEEL OF A VEHICLE, AND A PLANET CARRIER

The present application is a continuation of International Application No. PCT/SE2004/001360, filed Sep. 21, 2004, which claims priority to SE 0302568-1, filed Sep. 26, 2003, both of which are hereby incorporated by reference.

BACKGROUND AND SUMMARY

The present invention relates to an arrangement for driving a wheel of a vehicle comprising a planetary gear set, which in turn comprises a planet carrier, at least one surface of the planet carrier having a toothed structure, the arrangement comprising a power transmission part, at least one surface of the power transmission part having a toothed structure which corresponds to the toothed structure of the planet carrier surface and an extent which corresponds to the extent of the toothed structure of the planet carrier surface, and the toothed structures of the planet carrier and the power transmission part intermeshing with one another. The invention also relates to the planet carrier per se.

The invention more specifically relates to a so-called final drive, or hub-mounted reduction gear. The wheel is then arranged rotationally locked on a hub and the planetary gear set is connected between a drive shaft and the hub. The drive shaft is driven by an angular gear, or center gear, which is in turn driven by the vehicle engine by way of a transmission system.

Arranging a planetary gear set on each drive wheel in this way produces a reduction in rotational speed from the drive shaft to the hub and an increase in torque from the drive shaft to the hub.

The arrangement is particularly intended for applications in a plant vehicle such as a wheel loader, a dumper or the like. The invention could also be used, however, in other heavy vehicles such as trucks and buses.

W099/03699 describes a planetary gear set for a vehicle. The hub comprises an axially projecting axle part which is arranged in a through-hole in the planet carrier. The hole has internal splines and the axle part has external splines for producing rotational locking relative to one another. A plate having a greater radial extent than the axle part is arranged axially inside the planet carrier and is connected to the hub by way of a plurality of screws through holes in the plate and the axle part of the hub. This ensures that the hub is axially fixed in relation to the planet carrier.

It is desirable to provide an arrangement for driving a wheel of a vehicle which is cost-effective to produce and which creates the prerequisites for a long service life.

In accordance with an aspect of the present invention, a surface of the planet carrier provided with a toothed structure extends in such a way that the toothed structure is exposed in the axial direction of the planet carrier.

The toothed structure forms a ridge-valley configuration having elongate, parallel ridges and valleys. The term exposed in the axial direction is intended to signify that at least some of the ridges are visible from above and are accessible for engagement in the axial direction.

The backs of the ridges therefore face outwards in the axial direction of the planet carrier. The term exposed in the axial direction is thus not intended to signify that the cross-sectional shape of the toothed structure is only visible from the side, but that at least some of the backs of the teeth are visible viewed from the axial direction of the planet carrier.

According to an aspect of the invention the planet carrier with toothed structure extends parallel to a plane. This creates the prerequisites for easy production of the toothed structure by milling parallel grooves in the surface.

According to a development of the preceding aspect the planet carrier surface with toothed structure extends parallel to a plane which is at least substantially at right angles to the axial direction of the planet carrier. This creates the prerequisites for an engagement that is beneficial in terms of fatigue strength.

It is desirable to provide a planet carrier which is cost-effective to produce and which affords a long service life in the intended application of a planetary gear set.

According to an aspect of the invention, at least one surface of the planet carrier has a toothed structure for meshing with a power transmission part, and said surface provided with a toothed structure extends in such a way that the toothed structure is exposed in the axial direction of the planet carrier.

Further advantageous embodiments and advantages of the invention will emerge from the following description.

BRIEF DESCRIPTION OF THE DRAWINGS

The invention will be described in more detail below with reference to the embodiments shown in the drawings attached, in which.

DETAILED DESCRIPTION

Figure 1:
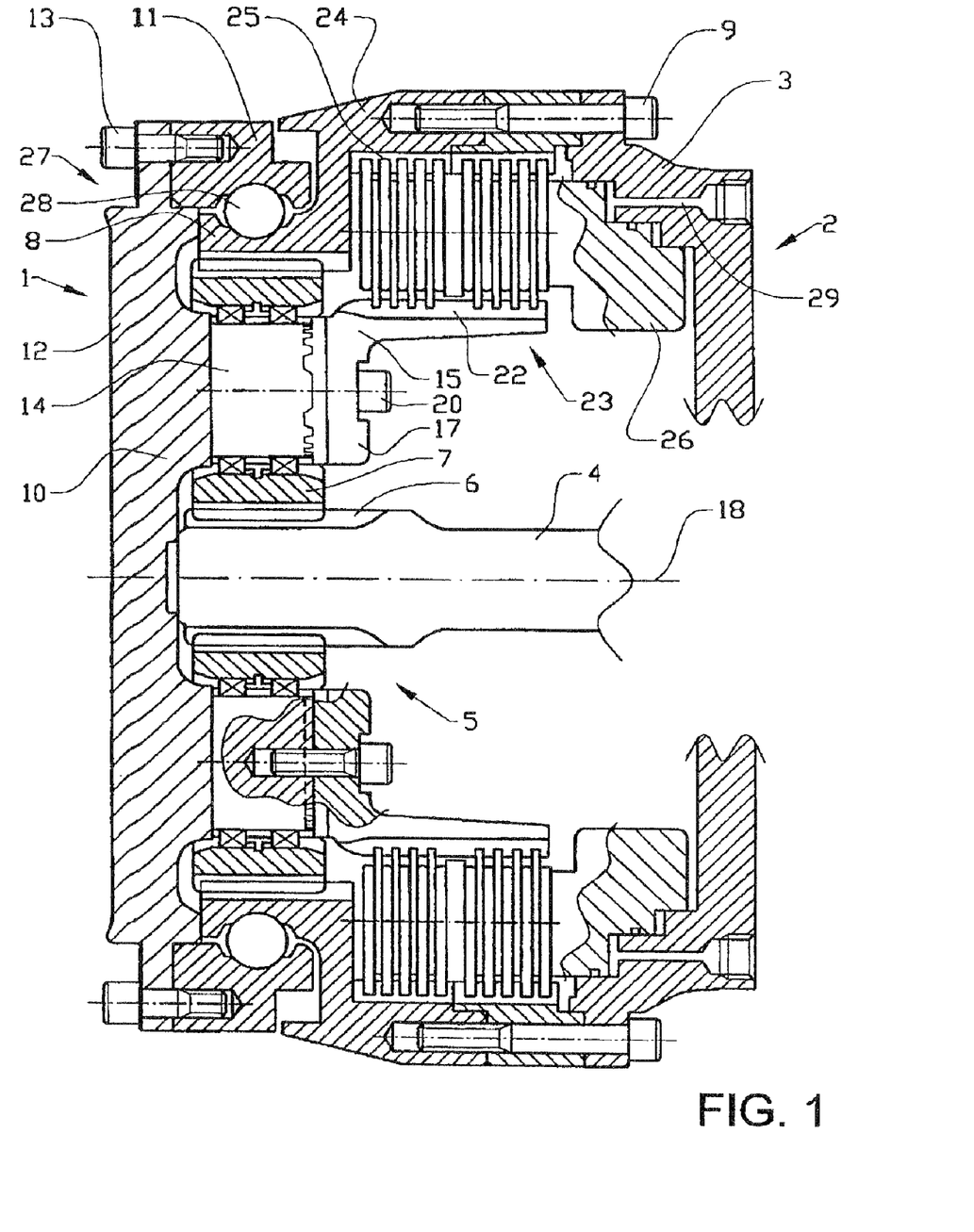
FIG. 1 shows a schematic, partially sectional side view of the drive arrangement according to a first embodiment.

FIG. 1 shows a schematic side view of a drive arrangement 1. The drive arrangement 1 is arranged at one end of the axle casing 3 of a wheel axle 2. A drive shaft 4 extends inside the axle casing 3. The drive shaft 4 is provided at one end 5 with the drive arrangement 1 in the form of a hub-mounted reduction gear, which comprises a planetary gear set. At its other end the drive shaft 4 is operatively connected to a center shaft (not shown), which is driven by the engine of the vehicle via a prop shaft.

In the conventional art the planetary gear set 5 comprises a sun gear 6, a plurality of planet wheels 7 and an annular gear 8, which are drive-connected to one another by way of toothed gears. The annular gear 8 is fixedly connected to the axle casing 3 by means of screwed connection 9. A planet carrier 10 is designed to hold the planet wheels 7. The planet wheels 7 are more specifically supported by pins 14, which project from the planet carrier 10 at intervals from one another in the circumferential direction of the planet carrier. In the preferred embodiment there are four planet wheels 7, see the number of pins in FIG. 2, but one, two, three, five or more planet wheels can be accommodated without departing from the scope of the invention.

According to the first embodiment the planet carrier 10 is integrated in the vehicle wheel hub. The planet carrier and the hub are thus integrally formed and will henceforth be referred to by the reference numeral 10 in FIG. 1.

The hub 10 is intended to carry a wheel (not shown) and is supported radially outside and against the annular gear 8. According to the first embodiment the hub 10 comprises an annular part 11 and a disk-shaped cover 12 fixedly connected to the annular part 11. The annular part 11 is arranged radially outside and supported against the annular gear 8. The annular part 11 and the disk-shaped cover 12 are securely connected together by way of a screwed connection 13. The cover 12 is arranged axially outside the planetary gear set and protects this from the external environment. The wheel is secured on the hub 10 by a conventional fastening arrangement (not shown), usually a screwed connection.

The arrangement 1 further comprises a power transmission part 15 in the form of an annular element. The power transmission part 15 is rotationally locked to the pins 14 of the planet carrier 10. In this case power is transmitted in braking. This is done by means of a brake device 23 arranged radially outside the power transmission part 15. The brake device 23 will be described in more detail below.

Figure 2:
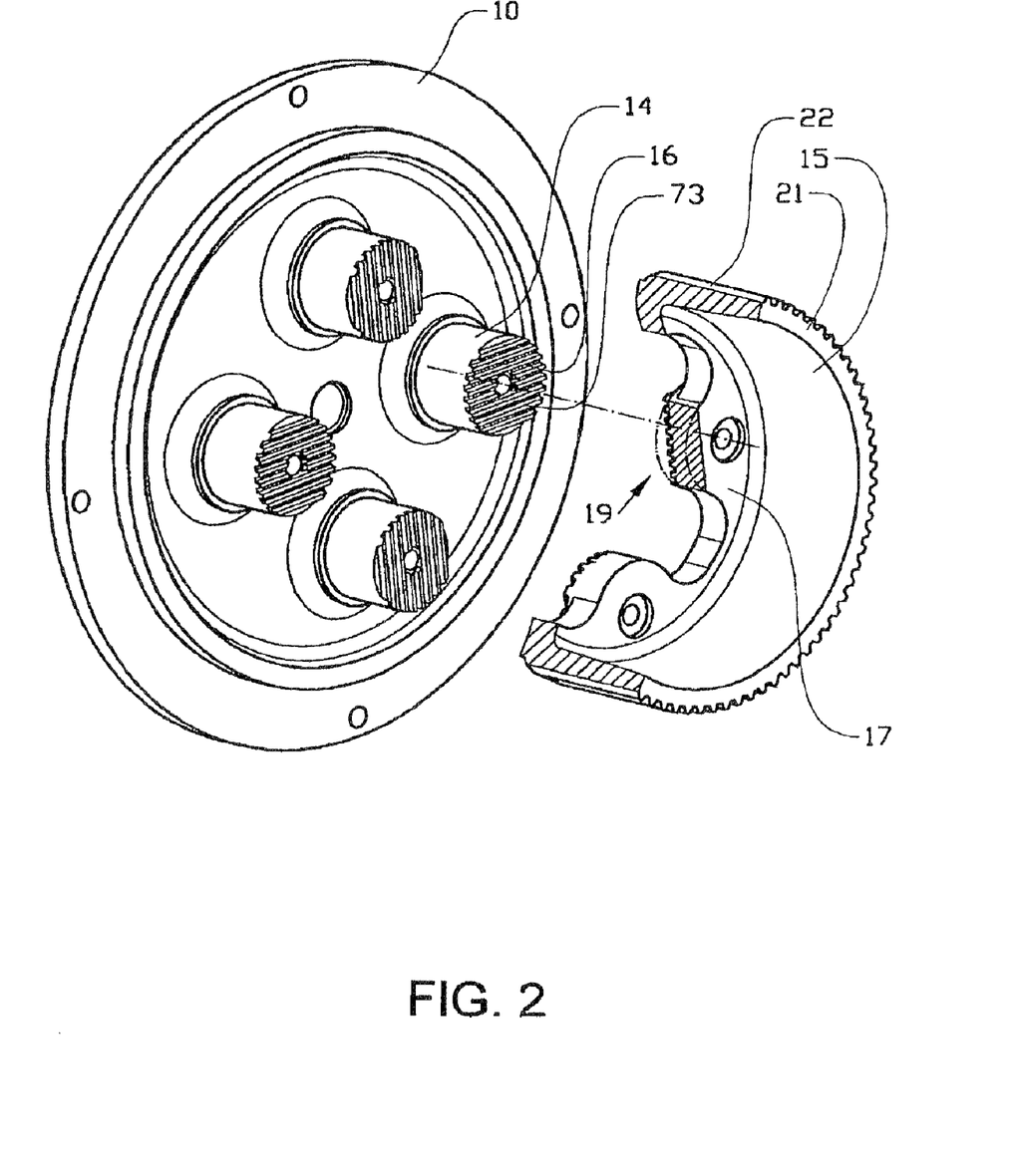
FIG. 2 shows a schematic, partially sectional and exploded view of the planet carrier and the power transmission part according to FIG. 1.

Each of the pins 14 of the planet carrier 10 has an end surface 73 having a toothed structure 16, see FIG. 2.

The end surface 14 of the pin extends parallel to a plane which is at right angles to the axial direction 18 of the planet carrier 10, see FIG. 1. The end surface therefore extends in such a way that the toothed structure 16 is exposed in the axial direction 18 of the planet carrier 10. The toothed structure 16 comprises a plurality of bars, which extend parallel to one another in a first direction. In other words, the toothed structure 16 forms a ridge-valley configuration. This can be produced, for example, by milling grooves in the end surface. The bars or ridges are then formed between the grooves. This can also be described as a type of splining.

As will be seen from FIG. 2, the bars of each of the pins 14 extend substantially in a radial direction in order to produce a good power transmission during rotation of the planet carrier 10. Thus in the embodiment shown in FIG. 2 two opposing pins have parallel bars. This means that the overall tooth engagement comprises a crosswise alignment of the bars. This configuration may also be referred to as cross-serrations.

The power transmission part 15 comprises a first plate-shaped section 17, which extends in a plane at right angles to the axial direction 18 of the planet carrier 10. The plate-shaped section 17 in turn comprises a plane surface which has a toothed structure 19, which complements the toothed structure 16 of the planet carrier pin 14. The toothed structure 19 of the power transmission part 15 is kept in engagement with the toothed structure 16 of the planet carrier 10 by a screwed connection 20.

The power transmission part 14 comprises a second plate-shaped section 21, which has a circular cross-sectional shape. The radially outer surface of the second plate-shaped section 21 is provided with splines 22 for engagement with brake disks of the brake device 23.

The brake device 23 comprises a wet brake in the form of a disk brake. The brake device 23 comprises two sets of brake disks, which in operation rotate in relation to one another. A first set of brake disks is connected to a static part 24 arranged radially outside the planet wheels 7 and is axially displaceable in relation to the static part 24. The connection consists of a splined connection 25. A second set of brake disks is connected to external splines 22 of the power transmission part 15.

The brake disks are therefore displaceable in the axial direction of said splined connections 22,25. Every other brake disk conventionally belongs to the first set and every second disk brake to the second set.

The brake device 23 further comprises a brake piston 26 for applying the brake by pressing the brake disks together, thereby increasing the friction between them.

Coupled to the brake piston is a duct 29 for delivering oil for application of the brake. On the opposite side of the brake disks to the brake piston 26, the annular gear 8 forms a pressure surface, or counter-surface, against which the disks are brought when applying the brake.

The brake device 23 and the hub 10 are arranged on different sides of said planet wheel 7. The brake device 23 therefore brakes the planet carrier 20 (and thereby the hub) directly in relation to the static casing part 24 by way of the power transmission part 15.

The annular gear 8 and the outer, static part 24 are integrally formed as an annular member. That is to say the annular gear 8 and the outer, static part 24 are integrated into the annular member.

The hub 10 is supported 27 against the annular gear 8.

The bearing 27 comprises a series of balls 28 arranged over a circular path between bearing races formed in the hub 10 and the annular gear 8. Such a bearing is often referred to as a four-point bearing in that four surfaces are ground for contact with the balls. In order to produce the bearing, therefore, a plurality of balls is fitted in between the annular gear 8 and the hub 10. In other words, there is no conventional ball bearing between the parts. The term "race" is intended to signify that a surface area is formed in order to receive the balls. This surface area usually has a domed or angled shape.

It should be inferred from this that the annular member comprising the annular gear 8 and the outer static part 24 has an annular shape, and the term annular shape encompasses different shapes of cirumferentially continuous, at least substantially circular structures.

Figure 3:
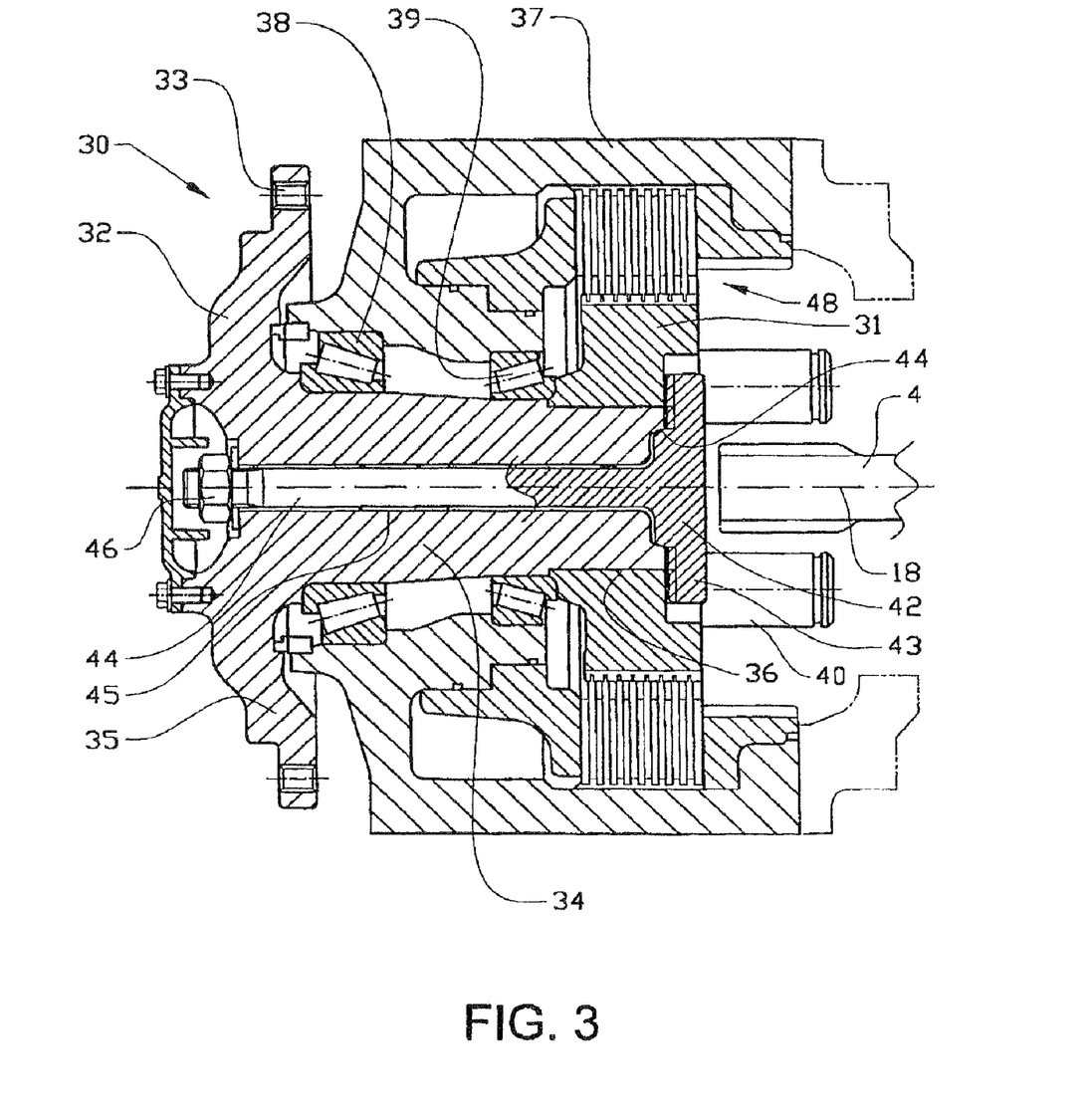
FIG. 3 shows a schematic, partially sectional side view of the drive arrangement according to a second embodiment.

FIG. 3 shows a sectional side view of a second embodiment of the drive arrangement 30. In the following, reference will also be made to FIG. 4. The drive shaft 4 drives the planet carrier 31 in the same way as described above.

The planet carrier 31 is rotationally locked to a hub 32, on which a wheel of the vehicle is intended to be fixed by way of a screwed connection 33. The hub 32 comprises an outer plate-shaped section 35 and an axle part 34 projecting axially inwards. The plate-shaped section 35 has openings for the screwed connection 33 and is here integrally formed with the axle part 34. The axle part 34 has a diameter narrowing from an axially outer end towards an axially inner end. The axle part 34 of the hub 32 is supported in the axle housing 37 by way of two roller bearings 38,39 axially spaced in relation to one another. The hub 10, and more specifically the axle part 13, is therefore supported in a housing for the arrangement. In the embodiment shown in FIG. 3 two tapered roller bearings 38,39 are used. A radially inner part of each of the bearings 38,39 bears against the axle part 34 and a radially outer part of each of the bearings bears directly against the housing 37.

The planet carrier 31 has a hole 36, which is designed to receive an inner section of the axle part 34. The centerline of the hole 36 in the planet carrier 31 coincides with the axis of rotation 18 of the planet carrier. The planet carrier 31 comprises an annular body and said hole 36 is a central through-hole. A plurality of pins 40 project axially inwards from the body of the planet carrier. The pins 40 are arranged a distance from one another in the circumferential direction of the planet carrier. Each of the planet wheels is intended to be supported on one of these pins 40.

Figure 4:
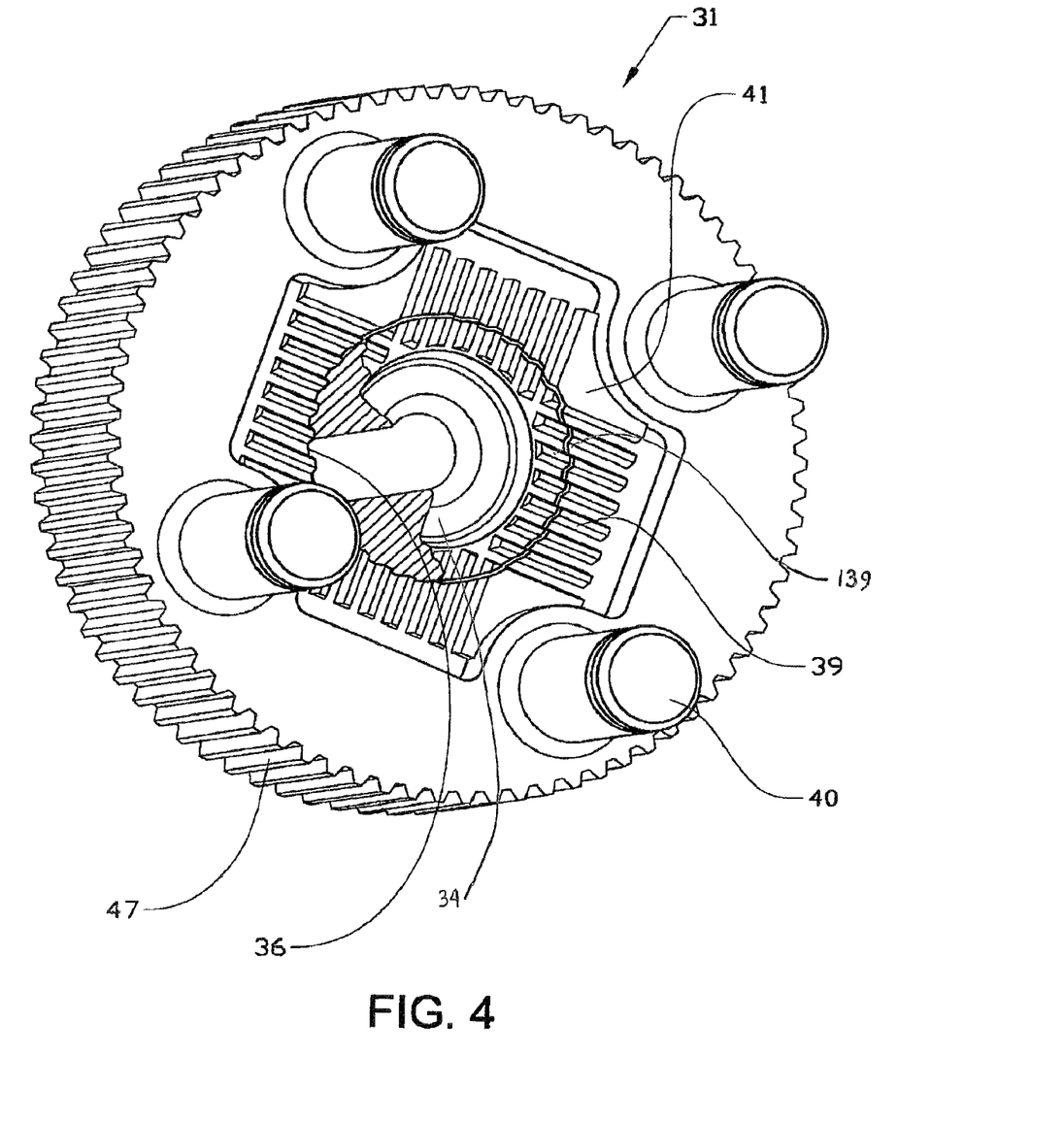
FIG. 4 shows a perspective view of the planet carrier according to FIG. 3.

The planet carrier 31 is rotationally locked in relation to the hub 32 by the toothed structures 39, see the planet carrier 31 in FIG. 4. The body of the planet carrier has a substantially plane surface 41, which extends substantially at right angles to the axis of rotation 18 of the planet carrier. This surface 41 faces away from the wheel and has the toothed structure 39.

The toothed structure 39 is more specifically situated between the pins 40 in the circumferential direction of the planet carrier.

The toothed structure 39 comprises a plurality of bars, which extend parallel to one another in a first direction. In other words, the toothed structure 39 forms a ridge-valley configuration. This can be produced, for example, by milling grooves in the plane surface 41. The bars or ridges are then formed between the grooves. This can also be described as a type of splining.

As will be seen from FIG. 4, the bars in each of the areas between the pins 40 extend substantially in a radial direction, in order to produce a good power transmission during rotation of the planet carrier 31.

The toothed structure areas here are in a cross configuration with the hole 36 in the planet carrier at the center of the cross. Thus, in the embodiment shown in FIG. 4, two areas on opposite sides of the hole 36 in the planet carrier have parallel bars. This means that the overall tooth engagement comprises a crosswise alignment of the bars. This configuration may also be referred to as cross-serrations.

The inner end of the axle part 34 of the hub has a toothed structure 139, which corresponds to the toothed structure 39 of the planet carrier, see FIG. 4. The toothed structure 139 therefore comprises multiple sets of parallel valleys/ridges in a plane end surface of the axle part. The toothed structure 139 of the hub is formed so that in each toothed structure area adjacent to a toothed structure area of the planet carrier the parts of the hub and the planet carrier thus form elongate tracks/grooves over the interface between the two parts.

The arrangement 30 comprises a power transmission part 42, see FIG. 3, which also has a toothed structure (not shown) which corresponds to the toothed structure 39,139 of the planet carrier surface 41 and axle part 34, and which in its extent corresponds to the extent of the intermeshing between the planet carrier surface and the end surface of the axle part. The power transmission part 42 thereby functions as a key for transmitting power between the planet carrier and the hub. The power transmission part 42 here forms a means of fixing the planet carrier 31 in relation to the hub 32. In operation, the power transmission part 42 in this case therefore assists in transmitting torque from the planet carrier 31 to the hub 32. For this purpose the power transmission part 42 has an expanded section 43 with said toothed structure, and an elongate element 44 projecting from the expanded section. The elongate element 44 is arranged in a central through-opening 45 in an axial direction though the hub 32. The opening 45 in the hub 32 has a centerline which coincides with the axis of rotation 18 of the planet carrier 32. The elongate element 44 has a circular shaped cross-section having a smaller outside diameter than the inside diameter of the opening 46.

The arrangement further comprises members 46 in the form of a screwed connection for fixing the hub 32 and the planet carrier 31 axially in relation to one another via the power transmission part 42. Said fixing members further comprise interacting elements for tightening the hub 32 against the planet carrier 31. These tightening elements comprise a threaded section of the elongate element 44 and a correspondingly shaped nut and are arranged at a second, axially outer end of the through-opening 45. The nut is located outside the hub 32 and is accessible from the outside.

The elongate element 44 here forms a bolt with the radially projecting section forming a head. The threaded section occurs only at an outer end of the bolt.

The expanded section 43 therefore forms a counter surface at a first, axially inner end of the through-opening 45.

The radially projecting section 43 is furthermore shaped like a plate or washer. The radially projecting section 43 thereby forms a head of the elongate element 44.

The radially projecting section 43 further comprises cylindrical guide surfaces 44 for guiding interaction with correspondingly shaped surfaces of the axle part 34 of the hub 32. The guide surfaces 44 are suitably tapered conically outwards from an axially inner end.

These guide surfaces 44 mean that the hub 32 is centered in relation to the hub 32 and any reciprocal radial movement that may occur during rotation is thereby reduced or minimized.

The planet carrier 31 furthermore has a radially outer surface 47 having splines in an axial direction, see FIG. 4. These radially external splines are intended for axial guidance of a first set of-brake disks in a friction brake 48. The friction brake 48 is constructed in the same way as the brake 23 according to the first preferred embodiment and therefore comprises a second set of brake disks, which are axially guided in splines arranged inside the housing 37. The brake disks in the brake 48 are conventionally arranged with every other disk brake belonging to the first set and every second disk brake to the second set.

As an alternative to the embodiment of the planet carrier 31 in FIG. 4, the toothed structure may feasibly be situated right on the axial end surface rather than in a sunken, plane surface of the planet carrier. The toothed structure may then extend all the way out to the radial edge of the planet carrier.

Figure 5:
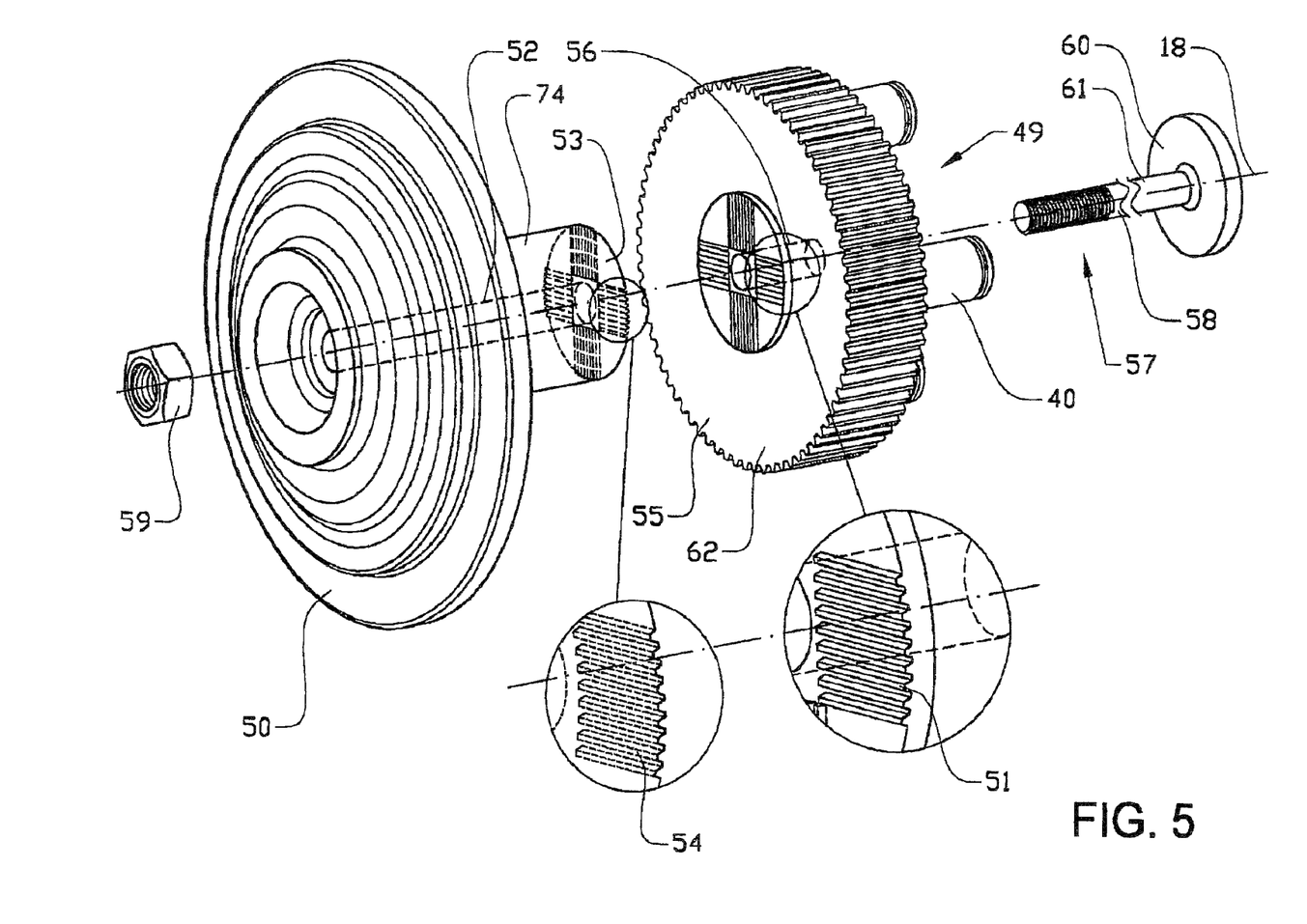
FIG. 5 shows a schematic, partially sectional and exploded view of the drive arrangement according to a third embodiment.

FIG. 5 shows a schematic, partially sectional exploded view of a drive arrangement 49 according to a third embodiment. Only the main differences that distinguish this embodiment from the second embodiment will be described below. The drive arrangement 49 comprises a power transmission part 50 in the form of a hub having an axle part 73 projecting axially inwards. The hub 50 comprises a through-opening 52 in an axial direction.

The arrangement 49 further comprises a planet carrier 55 having a plurality of projecting pins 40. In operation the power transmission part 50 therefore transmits torque from the planet carrier to the wheel of the vehicle. The planet carrier 55 comprises a through-opening 56 in an axial direction.

The arrangement further comprises members 57, in the form of a screwed connection, for fixing the hub 50 and the planet carrier 55 relative to one another in an axial direction. The screwed connection 57 comprises a screw element 58, or bolt, and a nut 59. The screw element 58 therefore comprises a radially expanded section 60, in the form of a head, and an elongate element 61 projecting from the head. The screw element 58 is arranged so that the elongate element 61 is situated in the openings 52, 56 in the hub 50 and the planet carrier 55. The head 60 of the screw element 58 is arranged on an axially inner side 18 of the planet carrier 55, that is to say on the same side as the pins 40, and the nut is arranged on an axially outer end of the through-opening 52,56. The nut is located outside the hub and is accessible from outside.

The free end of the axle part 74 has a substantially plane surface 53, which extends in a plane at right angles to the axis of rotation 18 of the arrangement.

The inner, plane surface 53 of the axle part in turn comprises a toothed structure 54. The toothed structure 54 comprises a plurality of bars, which extend parallel to one another in a first direction. In other words, the toothed structure 54 forms a ridge-valley configuration.

This can be produced, for example, by milling grooves in the plane surface 53. The bars or ridges are then formed between the grooves. This can also be described as a type of splining.

As will be seen from FIG. 5, a first set of bars extend in a first area transversely over the end surface 53 of the axle part 74. A second set of bars extend in a second area transversely over the end surface 53 of the axle part 74. Each of the two sets of bars is divided centrally by said opening 52. The toothed structure areas here therefore lie in a cross configuration with the opening 52 at the center of the cross.

The planet carrier 55 has a plane surface 62 facing the axle part 74 and extending substantially at right angles to the axis of rotation 18 of the planet carrier 55.

This plane surface 62 in turn has a similarly formed toothed structure to the axle part 74.

When fixing the hub 50 to the planet carrier 55 by way of the screwed connection 57, the toothed structures 51,54 are brought into engagement with one another, thereby achieving a good power transmission during rotation of the planet carrier 55. In the embodiment shown in FIG. 5 two areas on opposite sides of the hole 52 in the hub 50 therefore have parallel bars. This means that the overall tooth engagement comprises a crosswise alignment of the bars. This configuration may also be referred to as cross-serrations.

Figure 6:
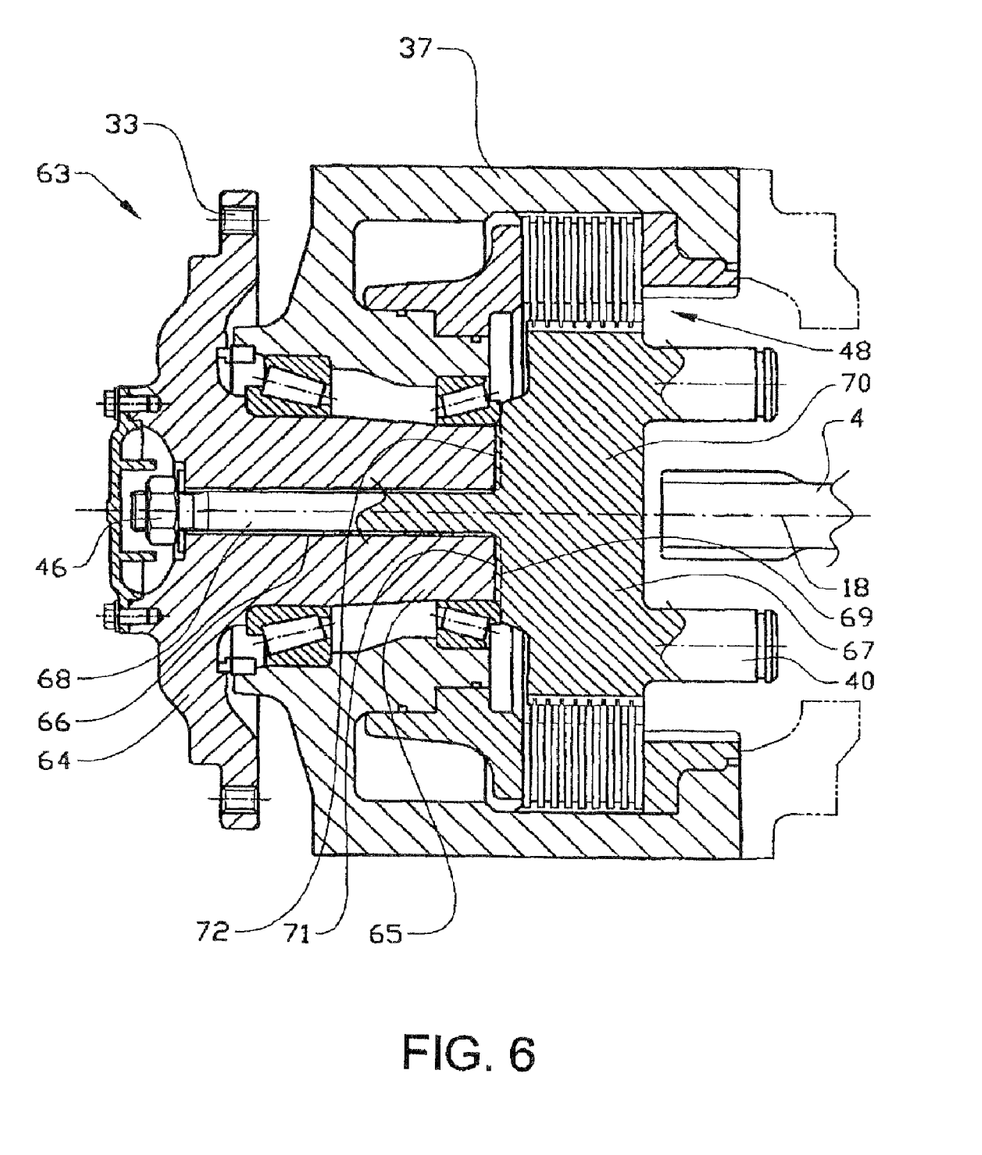
FIG. 6 shows a schematic, partially sectional side view of the drive arrangement according to a fourth embodiment.

FIG. 6 shows a schematic, partially sectional side view of a fourth embodiment of a drive arrangement 63. The fourth embodiment is a variant of the third embodiment and only the substantial differences that exist between these embodiments will be described below. The drive arrangement 63 comprises a power transmission part 64 in the form of a hub having an axle part 65 projecting axially inwards. The hub 64 comprises a central through-opening 66 in an axial direction.

The arrangement 63 further comprises a planet carrier 67 having a plurality of projecting pins 40. The planet carrier 67 comprises a circular body 70 and an elongate element 68, which projects centrally from the body 70 in an axial direction. The elongate element 68 is arranged in said opening 66 in the hub 64. The planet carrier 67 has a plane surface 69 facing the end surface 71 of the axle part 65 and extending substantially at right angles to the axis of rotation 18 of the planet carrier 67. The plane surface 69 of the planet carrier comprises a toothed structure 72, see FIG. 7. The plane surface 69 of the planet carrier with toothed structure is substantially circular and the elongate element 68 projects centrally from this plane surface 69.

Figure 7:
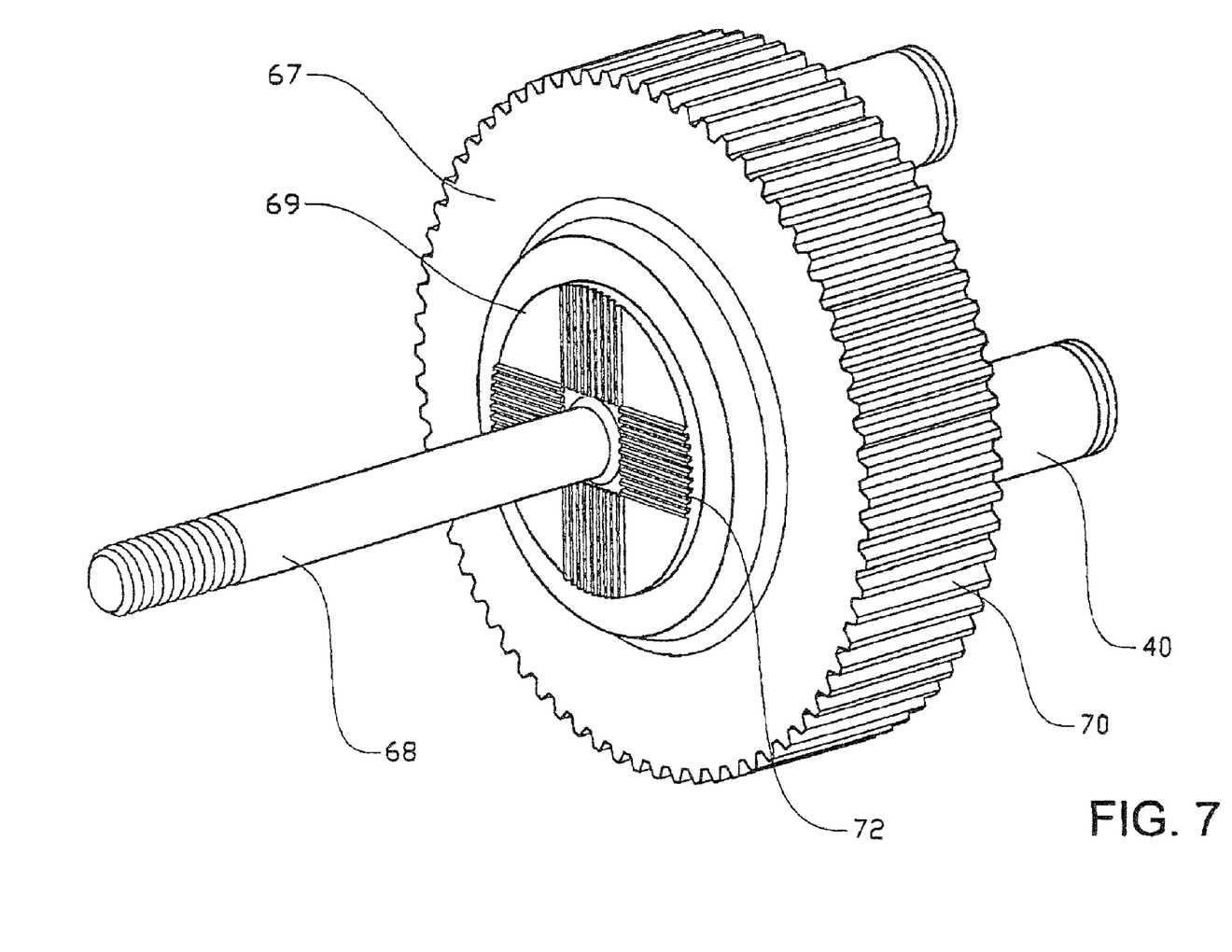
FIG. 7 shows a schematic, perspective view of the planet carrier according to a FIG. 6.

As will be seen from FIG. 7, the bars in each of the toothed structures extend substantially in a radial direction in order to produce a good power transmission during rotation of the planet carrier 67. The toothed structure areas here lie in a cross configuration with the elongate element 68 projecting from the center of the cross. Thus in the embodiment shown in FIG. 7 two areas on opposite sides of the projecting element 68 have parallel bars. This means that the overall tooth engagement comprises a crosswise alignment of the bars.

This configuration may also be referred to as cross-serrations.

The free end of the axle part 65 correspondingly has a plane end surface, which extends substantially at right angles to the axis of rotation of the planet carrier.

This plane end surface is provided with a toothed structure which corresponds to the toothed structure 69 of the planet carrier for intermeshing with one another.

The planet carrier 67 is arranged in relation to the hub 64 in such a way that the elongate element 68 lies in the opening 66 in the hub 64. The elongate element 68 has a threaded section at its free end and a nut 46 is brought into engagement with the threaded section when assembling the arrangement. The nut 46 is therefore situated at an axially outer end of the through-opening 66. The nut is located outside the hub and is accessible from outside.

When assembling the hub 64 and the planet carrier 67 the toothed structures are brought into engagement with one another.

In operation, the power transmission part 64 therefore transmits torque from the planet carrier 67 to the wheel of the vehicle.

The invention must not be regarded as being limited to the exemplary embodiments described above, a number of further variants and modifications being feasible without departing from the scope of the following patent claims.

For example, the invention is not limited to a planet carrier with toothed structure that extends parallel to a plane. The planet carrier with toothed structure may have a curved or rounded shape, for example.

The toothed structure solution described above may also feasibly be combined with conventional intermeshing systems, such that an axle part is provided with external, linear splines in an axial direction for engagement with correspondingly formed splines in a hole.

The axle part may then, for example, form an integral part of the hub and the hole may be situated in the planet carrier, cf. the embodiments illustrated in FIGS. 3 and 4.

The toothed structures in the embodiments above can be produced by conventional means, for example by milling or planing.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. An arrangement for driving a wheel of a vehicle comprising:
   a planetary gear set, the planetary gear set comprising a planet carrier, at least one surface of the planet carrier having a toothed structure,
   a power transmission part, at least one surface of the power transmission part having a toothed structure that corresponds to the toothed structure of the planet carrier surface and an extent that corresponds to an extent of the planet carrier surface, the toothed structures of the planet carrier and the power transmission part intermeshing with one another,
   wherein the surface of the planet carrier having the toothed structure extends in such a way that the toothed structure is exposed in an axial direction of the planet carrier, and the toothed structure comprises a plurality of first bars which extend parallel to one another in a plane perpendicular to the axial direction of the planet carrier.

2. The arrangement as claimed in claim 1, wherein the planet carrier surface having the toothed structure extends parallel to a plane.

3. The arrangement as claimed in claim 1, wherein the planet carrier surface having the toothed structure extends parallel to a plane which is at least substantially at right angles to the axial direction of the planet carrier.

4. The arrangement as claimed in claim 1, wherein the toothed structure comprises a plurality of second bars which extend parallel to one another in a second direction that differs from the first direction.

5. The arrangement as claimed in claim 4, wherein the second direction is at right angles to the first direction.

6. The arrangement as claimed in claim 4, wherein the planet carrier surface with toothed structure comprises a plurality of areas with toothed structure, the areas being arranged at an interval from one another in the circumferential direction of the planet carrier, and that the bars of the toothed structure extend substantially at right angles to the axial direction of the planet carrier within each area.

7. The arrangement as claimed in claim 6, wherein the planet carrier comprises a plurality of axially projecting pins for supporting planet wheels, and each of the areas with toothed structure is situated at the end of the pin remote from the planet carrier.

8. The arrangement as claimed in claim 7, wherein the power transmission part comprises an annular element having a surface which extends in an axial direction and is provided with splines for carrying a plurality of first brake disks in a friction brake.

9. The arrangement as claimed in claim 6, wherein the planet carrier comprises a plurality of axially projecting-pins, and the surface with toothed structure is situated between the pins in the circumferential direction of the planet carrier.

10. The arrangement as claimed in claim 9, wherein the planet carrier comprises a body having a central opening, the power transmission part forms a means of fixing the planet carrier and the hub, and the means of fixing for this purpose comprises an expanded section with the toothed structure and an elongate element which projects from the expanded section and is arranged in the central opening.

11. The arrangement as claimed in claim 6, wherein the planet carrier comprises a plurality of axially projecting pins, and the surface with toothed structure is situated on a surface of the tooth carrier remote from the surface from which the pins project.

12. The arrangement as claimed in claim 11, wherein the power transmission part forms a hub, and the surface of the hub facing the planet carrier has the toothed structure.

13. The arrangement as claimed in claim 1, wherein the arrangement comprises means for fixing the power transmission part against the planet carrier in such a way that the surfaces with toothed structure are kept in engagement with one another.

14. The arrangement as claimed in claim 13, wherein the fixing means comprise a screwed connection.

15. The arrangement as claimed in claim 13, wherein the planet carrier comprises a body having a central opening.

16. The arrangement as claimed in claim 15, wherein the fixing means comprises a section having, at least in part, a greater radial extent than the central opening in the planet carrier, and the fixing means comprises an elongate section which extends from the expanded section through the central opening.

17. The arrangement as claimed in claim 12, wherein the hub comprises a central through-opening, and the elongate section of the fixing means extends through the opening in the hub and the fixing means comprises elements for fixing the planet carrier in relation to the hub from the outside of the hub.

18. The arrangement as claimed in claim 12, wherein the hub comprises a central through-opening, the planet carrier comprises an elongate section which extends through the central opening in the hub and the fixing means comprises elements for fixing the planet carrier in relation to the hub from the outside of the hub.

19. A planet carrier for a planetary gear set, at least one surface of the planet carrier having a toothed structure for engagement with a power transmission part, wherein the surface provided with a tooth structure extends in such way that the toothed structure is exposed in the axial direction of the planet carrier, and the toothed structure comprises a plurality of first bars which extend parallel to one another in a plane perpendicular to the axial direction of the planet carrier.

20. The planet carrier as claimed in claim 19, wherein the planet carrier surface with toothed structure extends parallel to a plane.

21. The planet carrier as claimed in claim 19, wherein the planet carrier surface with toothed structure extends parallel to a plane which is at least substantially at right angles to the axial direction of the planet carrier.

22. The planet carrier as claimed in claim 19, wherein the toothed structure comprises a plurality of second bars which extend parallel to one another in a second direction that differs from the first direction.

23. The planet carrier as claimed in claim 22, wherein the second direction is at right angles to the first direction.

* * * * *